(12) United States Patent
Desjoyeaux et al.

(10) Patent No.: US 12,122,106 B2
(45) Date of Patent: Oct. 22, 2024

(54) TOOL FOR MANUFACTURING OPENWORK ELEMENTS SUCH AS CASCADES FOR AIRCRAFT NACELLES AND METHOD USING SUCH A TOOL

(71) Applicant: Safran Nacelles, Gonfreville l'Orcher (FR)

(72) Inventors: Bertrand Desjoyeaux, Moissy Cramayel (FR); Mickaël Sorel, Moissy Cramayel (FR); Franck Maze, Moissy Cramayel (FR); Géraldine Oliveux, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 196 days.

(21) Appl. No.: 17/843,224

(22) Filed: Jun. 17, 2022

(65) Prior Publication Data
US 2022/0314558 A1 Oct. 6, 2022

Related U.S. Application Data

(63) Continuation of application No. PCT/FR2020/052486, filed on Dec. 17, 2020.

(30) Foreign Application Priority Data

Dec. 19, 2019 (FR) .................................... 19/14856

(51) Int. Cl.
*B29C 70/46* (2006.01)
*B29C 33/00* (2006.01)
(Continued)

(52) U.S. Cl.
CPC .......... *B29C 70/46* (2013.01); *B29C 33/0033* (2013.01); *B29C 33/485* (2013.01); *B29C 70/54* (2013.01); *B29L 2031/3076* (2013.01)

(58) Field of Classification Search
CPC ....... B29C 70/46; B29C 70/54; B29C 33/485; B29C 33/505; B29L 2031/3076; B29L 2031/737; F05D 2240/129
See application file for complete search history.

(56) References Cited

U.S. PATENT DOCUMENTS 5,356,692 A 10/1994 Perez
5,576,079 A 11/1996 Forman et al.
(Continued)

FOREIGN PATENT DOCUMENTS

EP 2944452 11/2015
FR 2869258 10/2005

OTHER PUBLICATIONS

International Search Report issued in corresponding International Application PCT/FR2020/052486, mailed Apr. 28, 2021.

*Primary Examiner* — Jerzi H Moreno Hernandez
(74) *Attorney, Agent, or Firm* — Burris Law, PLLC

(57) ABSTRACT

Tooling for manufacture of an apertured element made of a composite material includes first and second sole plates and tooling elements. Each sole plate is configured to be placed on either side of the apertured element to be manufactured. The tooling elements are placed between the first and second sole plates. The tooling elements include at least one core and peripheral bars. The core is configured to delimit a cell of the apertured element to be manufactured. The core is movable in translation along the first and second sole plates. The peripheral bars are placed on a periphery of the core and configured to delimit the apertured element to be manufactured. At least one peripheral bar is movable in translation along the first and second sole plates.

15 Claims, 5 Drawing Sheets

(51) Int. Cl.
*B29C 33/48* (2006.01)
*B29C 70/54* (2006.01)
*B29L 31/30* (2006.01)

(56) References Cited

U.S. PATENT DOCUMENTS

| | | | |
|---|---|---|---|
| 2016/0186689 A1* | 6/2016 | Bartel | B29C 70/342 |
| | | | 264/296 |
| 2018/0222131 A1 | 8/2018 | Ducrot et al. | |
| 2020/0108525 A1* | 4/2020 | Dark | B29C 70/46 |
| 2021/0023745 A1* | 1/2021 | VanDeMark | B64D 29/06 |

* cited by examiner

TOOL FOR MANUFACTURING OPENWORK ELEMENTS SUCH AS CASCADES FOR AIRCRAFT NACELLES AND METHOD USING SUCH A TOOL

CROSS-REFERENCE TO RELATED APPLICATIONS

This application is a continuation of International Application No. PCT/FR2020/052486, filed on Dec. 17, 2020, which claims priority to and the benefit of FR 1914856 filed on Dec. 19, 2019. The disclosures of the above applications are incorporated herein by reference.

FIELD

The present disclosure relates to tooling for the manufacture of apertured elements such as thrust reverser cascades for an aircraft nacelle and a method for manufacturing apertured elements using such a tooling.

BACKGROUND

The statements in this section merely provide background information related to the present disclosure and may not constitute prior art.

An aircraft is propelled by at least one propulsion unit including a turbojet engine housed in a nacelle. Each propulsion unit is attached to the aircraft by a mast generally located under or over a wing or at the level of the fuselage of the aircraft.

In general, a nacelle has a tubular structure comprising an air inlet upstream of the turbojet engine, a middle section configured to surround a fan of the turbojet engine, a downstream section that could accommodate thrust reversal means, called thrust reversers, and configured to surround the combustion chamber of the turbojet engine, and generally terminates in an exhaust nozzle whose outlet is located downstream of the turbojet engine.

Thrust reversers comprise movable thrust reverser elements, usually two movable thrust reverser elements, carried by the nacelle so as to be displaced between a closed (direct jet) position in which the thrust reverser is inactive, and an open (reverse jet) position in which the thrust reverser is active, that is to say it returns at least part of the gas flow generated by the turbojet engine in the reverse direction opposite to the flow guided by the nacelle.

In many types of thrust reversers, the movable thrust reverser elements comprise air directing elements which return at least one portion of the gas flow outwards and forwards, these air directing elements are cascades such as fin cascades.

Advantageously, the cascades are made of composite materials, in order to make them lighter than metal cascades. In general, such cascades are manufactured through a method of manually laying up numerous pieces of composite fabrics, which is very expensive and does not allow obtaining aerodynamic profiles that are really scalable.

In a variant described in the patent FR 2 869 258 B1, the cascades made of a composite material are manufactured through a thermocompression molding method using a tooling comprising a punch and a die. Such a method results in limiting the geometry of the cascades. Indeed, the cascades obtained by this type of method depend on the geometry of the tooling and require drafts to enable demolding.

There is also slipping multi-layered tooling offering a little more demolding possibilities without the need for any draft.

In another variant, the composite material cascades are manufactured through a thermocompression molding method using a tooling including a base with flexible cores (silicone) adapted to swell under heat, and a cover. In this type of method, a composite material is placed in the tooling, which is then closed, then heated up in order to make the cores swell. The material is then solidified between the cores, which allows manufacturing the cascades. The drawback of this type of method is the lack of control of the expansion of the cores and therefore of the geometry of the gates thus generated.

Another method for manufacturing cascades made of a composite material by thermocompression consists in using a tooling including a base with expandable rigid cores, and a cover. Unlike the previous method, the expandable rigid cores are cores formed of substantially L-shaped elements forming the walls and angles of the cores. These elements are movable in order to enable the mechanical expansion of the cores. Such a method is complex and expensive because of the mechanical complexity of the tooling. In addition, demolding is complex.

SUMMARY

The present disclosure provides tooling and a method for manufacturing apertured elements made of a composite material, such as thrust reverser cascades for an aircraft nacelle, which is less expensive than the previously-described tooling and methods, and which allows making apertured elements having geometries adapted to the aerodynamic performances of the nacelle.

The present disclosure provides tooling for the manufacture of an apertured element made of a composite material, such as an air cascade vane or a thrust reverser cascade for an aircraft nacelle. The tooling includes first and second sole plates, each sole plate being configured to be placed on either side of the apertured element to be manufactured; tooling elements placed between the first and second sole plates. The tooling elements comprising at least one core configured to delimit a cell of the apertured element to be manufactured and peripheral bars placed on the periphery of the cores and configured to delimit the apertured element to be manufactured. At least one peripheral bar is movable in translation along the first and second sole plates.

Thus, when the material configured to form the apertured element, at least in part, is placed in the tooling between the tooling elements, the tooling elements are free to slide between the first and second sole plates in order to compress the material upon the application of a force on the peripheral bars in the direction of the cores.

A "material configured to form the apertured element at least in part," means a composite material pre-impregnated with resin, or a fibrous reinforcement to which a resin will subsequently be added in order to form the composite material forming the apertured element.

The tooling is simple and inexpensive. The material arrangement is facilitated in particular by the mobility of the tooling elements and the accessibility to the inter-element spaces. It allows making apertured elements having geometries adapted to the aerodynamic performances of the nacelle by the freedom of mobility of the tooling elements and the freedom of shape of the first and second sole plates and of the tooling elements.

The tooling is a mold for manufacturing an apertured element. The apertured element is delimited as much as possible by the first and second sole plates, and the peripheral bars.

The first and second sole plates, and the peripheral bars correspond to the walls of the mold.

The apertured element obtained using the tooling according to the present disclosure has longitudinal and transverse profiles delimiting cells. The profiles extending transversely between the first and second sole plates. The peripheral profiles extending along the peripheral bars.

Furthermore, such a tooling allows applying a strong pressure on the material configured to form the apertured element at least in part to provide spreading thereof in the cavity of the closed mold (up to 200 and possibly 300 bars).

The peripheral bars are elements forming a peripheral fence configured to delimit the apertured element to be manufactured.

In other words, the first and second sole plates are configured to sandwich the apertured element to be manufactured.

The tooling of the present disclosure includes one or more of the following optional features considered alone or in any possible combination.

In one form, the first and second sole plates are parallel.

In another form, the first and second sole plates are curved with an angular sector in the range of 30 degrees to 60 degrees, so as to allow generating apertured elements whose geometry is adapted to the aerodynamic performances of the nacelle.

In yet another form, the first and second sole plates are planar. The tooling elements have respective interface surfaces with the first and second sole plates which are complementary to the first and second sole plates.

In one form, at least one core is movable in translation along the first and second sole plates.

In another form, each peripheral bar is movable in translation along the first and second sole plates.

In yet another form, the tooling includes at least one peripheral bar which is not movable in translation along the first and second sole plates. Thus, the peripheral bar is fastened to at least one amongst the first and second sole plates.

In one form, the tooling includes at least two adjacent peripheral bars connected together so as to form a L-shaped angle bar.

In another form, the angle bar is not movable in translation along the first and second sole plates. Thus, the angle bar is fastened to at least one amongst the first and second sole plates.

In yet another form, the angle bar is movable in translation along the first and second sole plates.

In one form, the tooling includes displacing devices such as cylinders configured to apply a force against each peripheral bar movable in translation. In general, "displacing device" means any controlled device allowing exerting a force on the tooling element, the force being enough to obtain the displacement of said tooling element. It may consist of a hydraulic cylinder, an electric cylinder, a mechanical system with a motor and a worm screw or a lever arm, etc.

In another form, the tooling further includes additional tooling elements configured to be placed between the first and second sole plates between at least one core and one peripheral bar. The additional tooling elements being configured to enable molding of solid elements such as flanges.

In yet another form, the additional tooling elements include at least one block movable in translation perpendicular to the first and second sole plates and configured to delimit a solid element such as a flange.

In one form, the tooling further includes a compaction device configured to provide the translation of the block in order to enable the compaction of the material placed in the tooling to form the solid element at least in part.

In another form, the compaction device includes at least one protuberance placed on the second sole plate configured to cooperate with a notch placed on an additional tooling element at the interface with the second sole plate, so as to allow displacing the additional tooling element to compact the material configured to form the solid element at least in part.

In yet another form, the compaction device is an element such as a longitudinal bar configured to be placed in line with the block and configured to be displaced perpendicularly to the first and second sole plates by a displacing device such as a cylinder, so as to drive the block in translation perpendicular to the first and second sole plates.

In one form, the tooling includes excrescences for delimiting a minimum space between the cores.

In another form, the excrescences are placed on the cores at the level of their face(s) placed opposite the first and/or second sole plates. The excrescences of adjacent cores having complementary shapes so as to enable interlocking thereof when the cores are brought close to each other while leaving a minimum space forming a compression chamber between the cores. Thus, when the material configured to form the apertured element at least in part is placed in the tooling between the tooling elements, the excrescences limit the displacements of the material out of the spaces forming the compression chamber.

In one form, the cores with excrescences have a C or Z or L shape.

In another form, each core includes at least one indexing tab configured to cooperate with a cavity placed in an adjacent core so as to enable interlocking of the cores upon approach thereof. Thus, the indexing tabs provide a better positioning of the cores during the displacement thereof.

In yet another form, the indexing tabs have a V or U shape.

In one form, the tooling includes guide members configured to guide the tooling elements in their movement. Thus, the tooling elements have a better relative positioning. The guide members allow limiting oscillations around axes perpendicular to the first and second sole plates. For example, the guide members are ribs cooperating with grooves.

In another form, the guide members comprise crosspieces placed between the cores and the first and/or second sole plates. Each crosspiece corresponding to a row of cores and including ribs cooperating with grooves placed on the cores at the interface with the crosspieces. The ribs and the grooves are parallel to a direction of displacement of the cores.

In one form, the guide members further comprise additional grooves and crosspieces. The grooves are placed on the crosspieces opposite the ribs. The grooves being parallel to another direction of displacement of the cores. The additional crosspieces are placed perpendicular to the crosspieces between the crosspieces and the first and/or second sole plates. The additional crosspieces comprising additional ribs parallel to the additional grooves. Thus, the grooves of the cores guide the displacement of the cores in a first direction and the additional grooves of the crosspieces guide the displacement of the cores in a second direction.

In another form, the tooling is made of a metallic material or of a plastic material with a melting point adapted to allow heating up the material configured to form the apertured element at least in part, placed thereinside, without being altered. A "melting point adapted to allow heating up the material configured to form the apertured element at least in part, placed thereinside, without being altered" means a melting point comprised between at least a few degrees above the temperature desired for the solidification of the constituent material of the apertured element and at most a compatible melting temperature of non-significant degradation of the material of the consolidated apertured element for the melting time of the tooling element.

In yet another form, the cores are rigid and configured to be dismounted off the tooling. Alternatively, the cores are made of a material fusible at temperatures in the range of at least a few degrees above the temperature needed for the solidification of the constituent material of the apertured element, and at most a melting temperature compatible with non-significant degradation of the material of the consolidated apertured element, or soluble in a solvent compatible with non-degradation of the material of the consolidated apertured element, such as water, in order to be eliminated by melting or dissolution. Thus, it is possible to obtain complex shapes of apertured elements including undercut shapes. The cores may be made of a water-soluble material such as polyvinyl alcohol bonded sand concrete. In the variant according to which the cores are made of a material soluble in a solvent, the solvent must not alter the composite material forming the apertured element. In another variant, the cores are made of a metal alloy with a controlled melting point (so-called eutectic alloys).

In one form, the tooling is waterproof.

The present disclosure further provides a method for manufacturing apertured elements made of a composite material such as thrust reverser cascades for an aircraft nacelle by compression molding in a tooling as described before, comprising the following steps: (a) a step of disposing the tooling elements and a material configured to form the apertured element at least in part, during which the tooling elements are placed between the first and second sole plates, and the material configured to form the apertured element at least in part between the tooling elements, so as to obtain a closed tooling in which the material configured to form the apertured element at least in part is trapped between the tooling elements and forms a resistance to inhibit them from approaching each other; (b) a compression step during which a force is applied against the peripheral bars in the direction of the cores, so as to allow approaching of the tooling elements to each other and thus the compaction of the material configured to form the apertured element at least in part; (c) a consolidation step during which the material configured to form the apertured element at least in part hardens; and (d) a step of demolding the apertured element thus formed.

Thus, during the compression step, the tooling elements slide between the first and second sole plates and approach each other in order to enable the compaction of the material configured to form the apertured element at least in part.

As indicated before, "material configured to form the apertured element at least in part" means composite material forming the apertured element, or a portion of the composite material forming the apertured element, such as a fibrous reinforcement.

Such a method allows manufacturing apertured elements made of a composite material, such as thrust reverser cascades for an aircraft nacelle, having geometries adapted to the aerodynamic performances of the nacelle, thanks to a method that is simpler and less expensive than the methods of the prior art.

The method of the present disclosure includes one or more of the following optional features considered alone or according to any possible combination.

In one form, the material configured to form the apertured element at least in part is composed of fibers and resin in the form of a pre-impregnated composite material.

In another form, the material configured to form the apertured element at least in part is a resin-free fibrous structure.

In yet another form, during the compression step, a resin is introduced in a liquid form in order to impregnate the fibrous structure.

In one form, the material configured to form the apertured element at least in part is composed of fibers and resin in the form of a pre-impregnated composite material, and during the compression step, additional resin is introduced in a liquid form in order to impregnate the material configured to form the apertured element at least in part.

In another form, the resin of the material configured to form the apertured element at least in part is at least partially hardened.

In yet another form, the adjacent cores are configured to be displaced so that the spacing between adjacent cores is variable between 100% and 300% of the final thickness of the apertured element to be obtained.

In one form, the compression step is carried out mechanically by at least one displacing device such as a cylinder.

In another form, the compression step is carried out until obtaining a compaction of the material configured to form the apertured element at least in part between 5% and 70%.

In yet another form, the compression step is carried out by applying a force simultaneously on all peripheral bars.

In one form, the compression step is carried out by applying a force alternately on each peripheral bar.

In another form, the tooling includes additional tooling elements configured to be placed between the first and second sole plates between at least one core and one peripheral bar. The additional tooling elements are configured to enable molding of solid elements such as flanges. The method may include an additional compression step during which a force is applied against at least one additional tooling element, so as to enable the displacement of the additional tooling element and thus the compaction of the material configured to form the apertured element at least in part.

In yet another form, the additional compression step is carried out during the compression step. Alternatively, the additional compression step is carried out separately from the compression step.

In one form, the additional compression step is carried out mechanically by at least one additional displacing device such as an additional cylinder, acting on at least one additional tooling element.

In another form, the tooling further includes a compaction device including a longitudinal bar configured to be placed directly in line with the block and configured to drive the block in translation. The additional compression step is carried out mechanically by at least one additional displacing device such as an additional cylinder acting on the compaction device.

In yet another form, the tooling further includes a compaction device including at least one protuberance placed on one of the first and second sole plates and configured to cooperate with a notch placed on an additional tooling element at the interface with the second sole plate, so as to allow displacing the additional tooling element to compact the material configured to form the apertured element at least in part. The additional compression step is carried out upon closure of the tooling.

In one form, the method includes a step of adding (totally or partially) resin subsequent to the step of disposing the material configured to form the apertured element at least in part between the tooling elements. In one variant, the resin is added before the compression step. In another variant, the resin is added after the compression step. In another variant, the resin is added before and after the compression step.

In one form, the method includes a heating step during which the tooling is heated to soften the material configured to form the apertured element at least in part, prior to the compression step.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
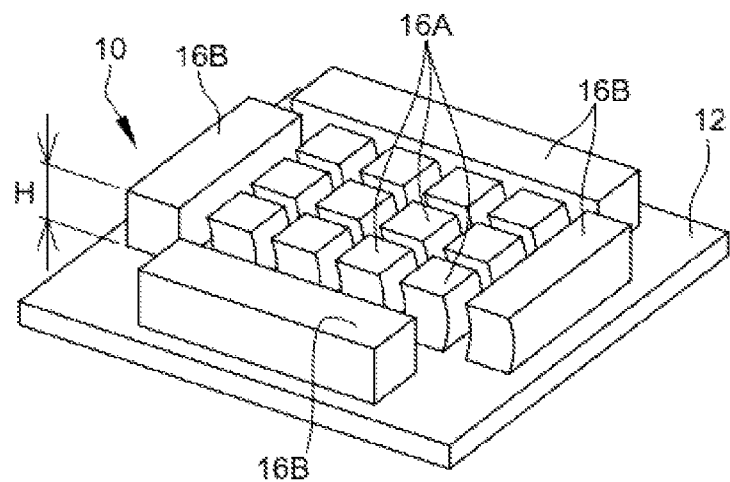
FIG. 1 is a partial schematic perspective view of a tooling according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, identical, similar or analogous components will be referred to by the same reference numerals and the terms "front", "rear", "horizontal", "vertical", "upper", "lower", etc. will be used without limitation and with reference to the drawings in order to facilitate the description.

FIG. 1 represents a tooling 10 according to the present disclosure including a first sole plate 12 on which tooling elements (cores and bars) are placed. The tooling 10 further includes a second sole plate (not shown) configured to be placed above the tooling elements.

The tooling 10 forms a mold allowing manufacturing apertured elements such as cascades 100 (FIG. 14) of a thrust reverser for an aircraft nacelle, according to the method described later on with regards to FIGS. 4, 5, and 8-10.

In the example of FIG. 1, the tooling elements comprise twelve cores 16A placed in four columns of three cores aligned on the same line, and four peripheral bars 16B which surround the cores 16A. The peripheral bars being parallel in pairs. The cores 16A are movable in translation along the first sole plate 12 and along the second sole plate. Furthermore, the peripheral bars 16B are movable in translation along the first sole plate 12 and along the second sole plate.

Thus, the first sole plate 12 and the second sole plate 14 include surfaces, respectively upper and lower surfaces, for sliding the tooling elements.

Alternatively, the tooling may include a different number of columns of cores and number of cores per column. For example, the tooling may include six columns of twelve cores each. In another example, the tooling may include different numbers of cores from one column to another. For example, the tool may include a row of seven cores and another row of ten cores.

The cores are rigid and configured to be extractable to enable the demolding of the apertured element to be manufactured.

In one variation, each core consists of several interlocking pieces, so as to enable the manufacture of apertured elements whose apertures have a complex shape while enabling the apertured element to be easily demolded.

Alternatively, all or part of the cores are fusible so as to be removed by melting, as will be described later on. To this end, the cores could be made of a metal alloy with a low melting point, that is to say higher than the thermocompression consolidation temperature of the apertured elements to be manufactured. In another variation used alternatively or partially, all or part of the cores are soluble. Thus, the cores are made of a material that is not soluble with the material of the apertured elements to be manufactured, but soluble by a solvent compatible with the material of the apertured elements to be manufactured once the latter has been consolidated enough.

The tooling 10 is represented placed horizontally in all figures of the present patent application. Alternatively, it could be placed according to another orientation, for example vertically in order to allow using the kinematics of means for carrying out the compaction steps described later on.

The tooling elements have heights H larger than or equal to the desired height of the apertured element to be manufactured. These heights H corresponding to the space between the first and second sole plates between which the tooling elements move. For a thrust reverser cascade, this height H is generally comprised between 30 and 60 mm (and possibly up to 80 mm with excess lengths to be eliminated afterwards), preferably between 35 and 50 mm. In general, the height H is unique for the same tooling, but it is possible to have different heights H for different tooling elements (this is particularly easy when using additional systems such as in FIG. 13). In general, the horizontal dimensions of the cores 16A are variable, so that the dimensions of the cores 16A correspond to the dimensions of the cells 102 (FIG. 14) of the apertured elements to be obtained.

Figure 2:
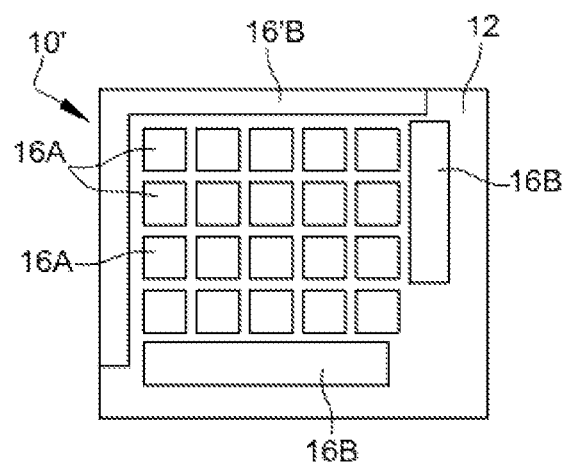
FIG. 2 is a schematic view of a first variation of the tooling of FIG. 1 according to a plane parallel to a sole plate of the tooling.

FIG. 2 illustrates a first variation of the tooling according to the present disclosure.

Unlike the tooling 10 of FIG. 1, the tooling elements include cores 16A, two adjacent peripheral bars connected together to form a first L-shaped angle bar 16'B and two other peripheral bars 16B. The first angle bar 16'B is fastened to the first sole plate 12, whereas the other two peripheral bars 16B are configured to be movable in translation along the first sole plate 12 and along the second sole plate (not represented).

The first angle bar 16'B is integral with the first sole plate 12.

Alternatively, the angle bar 16'B is an element distinct from the first sole plate 12 and is secured to the first sole plate 12.

Figure 3:
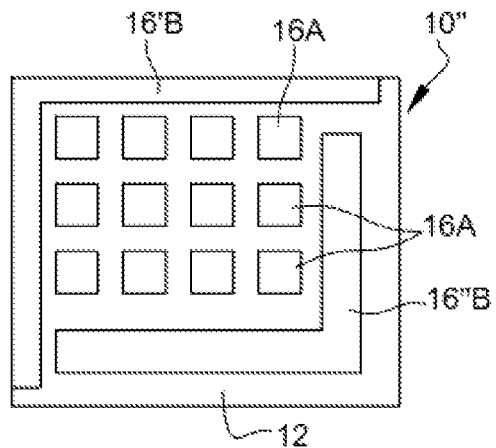
FIG. 3 is a schematic view of a second variation of the tooling of FIG. 1 according to a plane parallel to a sole plate of the tooling.

FIG. 3 illustrates a second variation of the tooling according to the present disclosure.

Unlike the tooling 10 of FIG. 1, the tooling elements include cores 16A, two adjacent peripheral bars connected together to form a first L-shaped angle bar 16'B, and two other peripheral bars connected together to form a second L-shaped angle bar 16"B. The first angle bar 16'B is fastened to the first sole plate 12, whereas the second angle bar 16"B is configured to be movable in translation along the first sole plate 12 and along the second sole plate (not shown).

In the same manner as with regards to FIG. 2, the first angle bar 16'B is integral with the first sole plate 12.

Alternatively, the first angle bar 16'B is an element distinct from the first sole plate 12 and is secured to the first sole plate 12.

Figure 4:
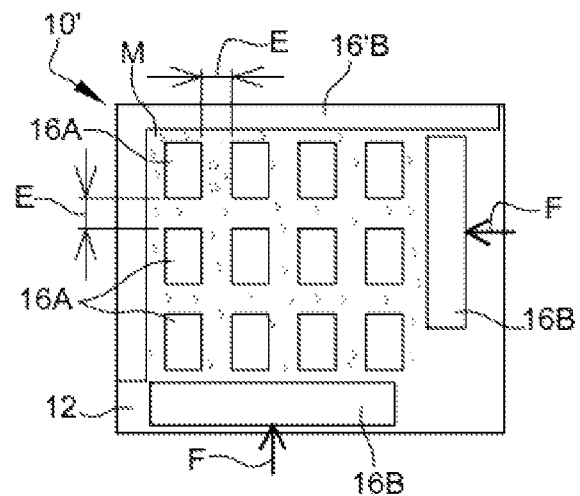
FIG. 4 is a schematic view of the tooling of FIG. 2 illustrating a method for manufacturing apertured elements made of a composite material according to the present disclosure.
Figure 5:
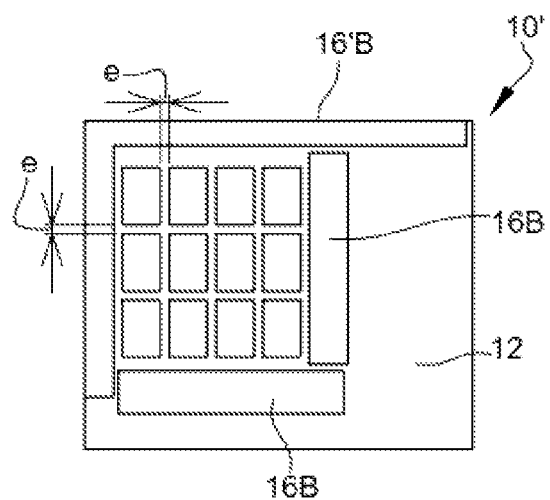
FIG. 5 is a schematic view of the tooling of FIG. 2 illustrating a method for manufacturing apertured elements made of a composite material according to the present disclosure.

FIGS. 4 and 5 illustrate a method for manufacturing an apertured element in the form of a thrust reverser cascade 100 (FIG. 14) for an aircraft nacelle, made of a composite material, thanks to the tooling 10' of FIG. 2. The cascade 100 includes longitudinal and transverse profiles 101 delimiting air passage cells 102, as will be seen with regards to FIG. 14.

Figure 14:
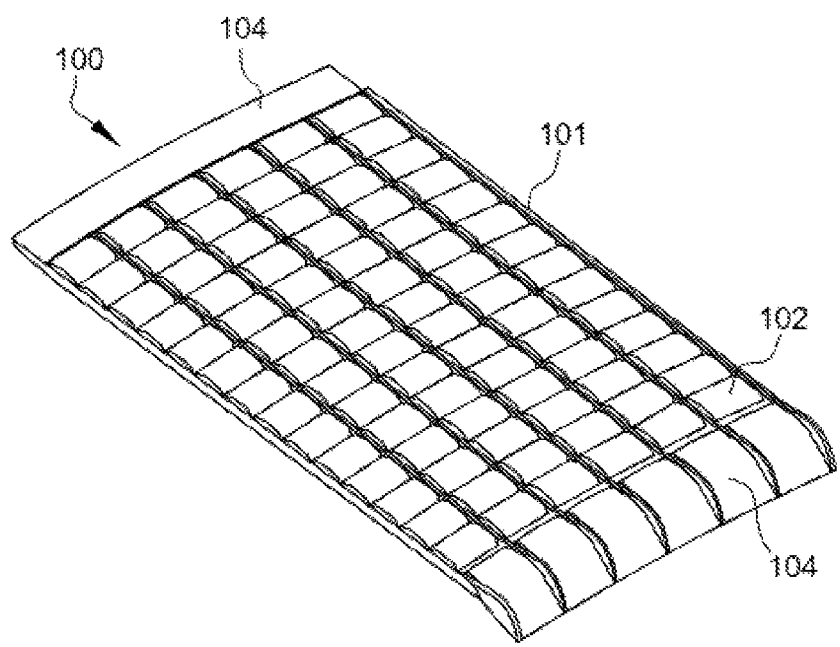
FIG. 14 is a schematic perspective view illustrating a thrust reverser cascade for an aircraft nacelle manufactured according to the method of the present disclosure.

The method includes, in this form, a step of disposing tooling elements 16A, 16B, 16'B and a pre-impregnated composite material M, over the first sole plate 12, the pre-impregnated composite material M being placed between the tooling elements 16A, 16B, 16'B, over the first sole plate 12. The pre-impregnated composite material M contributing to creating a distance between two adjacent tooling elements over the first sole plate 12. It forms a resistance between the tooling elements, to inhibit them from approaching each other. The pre-impregnated composite material M is configured to form the longitudinal and transverse profiles 101 of the apertured element to be obtained, whereas the cores 16A are configured to delimit recesses in order to form the air passage cells 102 (FIG. 14).

For example, the pre-impregnated composite material M comprises a thermoset or thermoplastic resin and fibers.

The resin of the pre-impregnated composite material M may be raw or partially crosslinked or completely crosslinked.

During this step of disposing the tooling elements, the peripheral bars may be placed before or after the cores. Furthermore, the pre-impregnated composite material is advantageously added as the tooling elements are placed, so as to allow controlling the spacing between the tooling elements, and to provide the arrangement of the fibers along the different surfaces of the apertured element to be obtained.

Advantageously, the pre-impregnated composite material M includes continuous fibers and/or discontinuous fibers, such as carbon, glass, aramid, nylon or else polyester fibers.

As example, the initial spacing E between the tooling elements 16A, 16B, 16'B is comprised between 1 mm and 8 mm, corresponding to 105% to 300% of the final thickness of the cascade 100 (FIG. 14) to be obtained. This initial spacing E is variable within the tooling.

Afterwards, the second sole plate (not shown) is placed over the tooling elements 16A, 16B, 16'B to close the tooling. Devices external or integrated into the sole plates allow controlling the distance between the two sole plates in order to limit clearances between the two sole plates, that is to say to guide the tooling elements 16A, 16B, 16'B and to limit their displacements in a direction transverse to the first 12 and second sole plates (clearance between the sole plates and the cores is between a few hundredths of a millimeter and a few tenths of a millimeter).

An optional heating step may be carried out, for example in order to soften the resin of the pre-impregnated composite material M.

Finally, during a compression step, a force F is applied against each peripheral bar 16B, in the direction of the cores 16A, perpendicular to the interfaces between the cores 16A and the peripheral bars 16B in order to bring the tooling elements 16A, 16B, 16'B close to each other, as represented in FIG. 5. This step allows compressing the pre-impregnated composite material M.

The force F is applied thanks to the action of a displacing device allowing exerting a force on the tooling element in order to obtain the displacement of said tooling element, such as for example a cylinder (not represented). Thus, as many displacing devices as movable bars are desired.

As example, the final spacing "e" between the tooling elements is in the range of 0.05 mm to 7 mm. This final spacing "e" creates the thicknesses of the walls of the apertured element to be molded.

The consolidation or hardening of the part is then obtained by maintaining the temperature and then cooling according to the values and durations adapted to the used resin. A thrust reverser cascade 100 (FIG. 14) for a nacelle is then obtained, by demolding the consolidated composite material and extracting the tooling elements. Finishing and machining operations may also be carried out.

This method is a compression molding method in a tooling according to the present disclosure.

During the compression step, the cores 16A and the peripheral bars 16B slide between the first and second sole plates and approach each other.

In the case where the cores are made of a metal alloy with a low melting point, a step of heating to a temperature higher than the melting temperature of the alloy is carried out after consolidation of the resin.

In one form, the heating step is carried out after cooling.

In another form, the method for manufacturing an apertured element such as the cascade 100 (FIG. 14) is carried out thanks to the tooling of FIG. 1 or 3.

The method using the tooling of FIG. 1 desires the use of four cylinders acting on each of the four peripheral bars 16B.

However, the method using the tooling of FIG. 3 desires the use of one single cylinder acting on the second angle bar 16"B.

Figure 6:
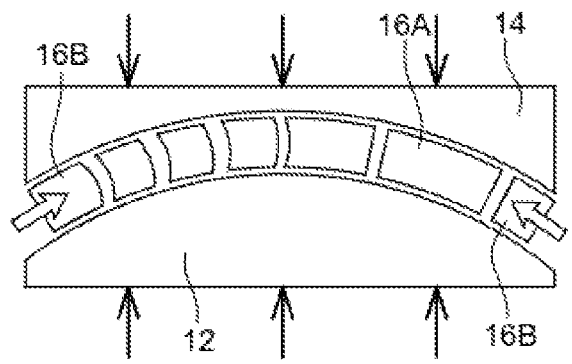
FIG. 6 is a schematic view of a first variation of the sole plates of the tooling of FIG. 1 according to a plane perpendicular to a sole plate of the tooling.

FIG. 6 is a cross-section of the tooling. It illustrates a first variant of the sole plates of the tooling according to the present disclosure. In this variant, the first and second sole plates 12, 14 are curved at the level of their interface with the tooling elements 16A, 16B. In this manner, the apertured elements manufactured by such a tooling will have a curved shape, also called circumferential.

The first and second sole plates 12, 14 are complementary to each other and to the tooling elements 16A, 16B, 16'B, 16"B, so as to allow closing the mold.

Furthermore, the surfaces of the cores 16A at the interface with the first and second sole plates 12, 14 are also curved to conform to the shape of the sole plates.

Figure 7:
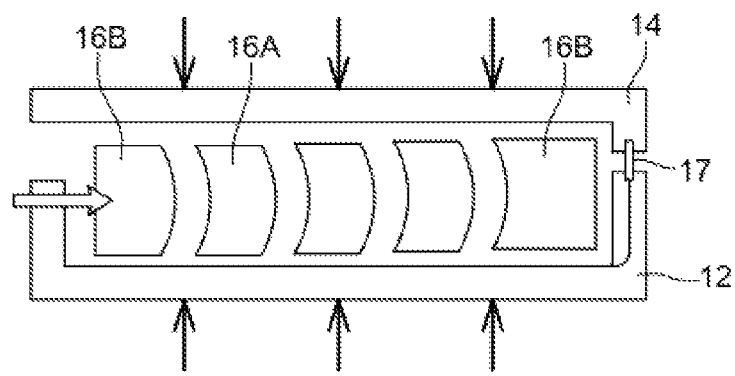
FIG. 7 is a schematic view of a second variation of the sole plates of the tooling of FIG. 1 according to a plane perpendicular to a sole plate of the tooling.

FIG. 7 illustrates a second variant of the sole plates of the tooling according to the present disclosure, wherein the first sole plate 12 is in the form of a U-shaped tray, in which the tooling elements 16A, 16B, 16'B are placed, and the second sole plate 14 is in the form of a U-shaped tray with an open side. Thus, the branches of the first and second sole plates 12, 14, placed opposite one another, are configured to be attached by attachment means 17 in order to close the mold. According to this variant, the peripheral bar placed in contact with the attached branches of the first and second sole plates 12, 14 is fixed.

Figure 8:
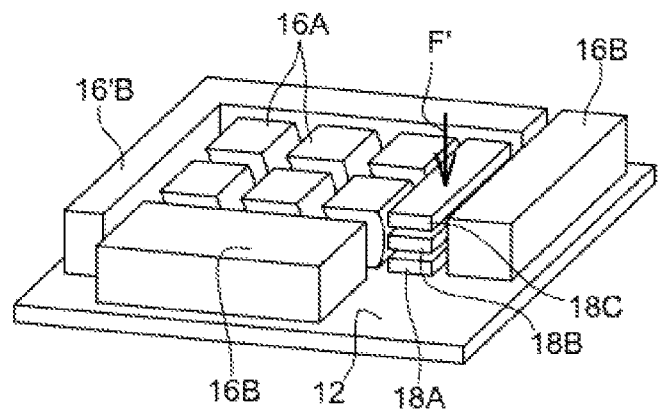
FIG. 8 is a partial schematic perspective view of the tooling of FIG. 2 comprising additional tooling elements.

FIG. 8 illustrates the tooling of FIG. 2, further including additional tooling elements 18A, 18B.

The additional tooling elements 18A, 18B are configured to enable molding of solid elements such as flanges 104 for connecting the cascade 100 (FIG. 14) to a fixed structure or an external aerodynamic cowling of the nacelle. Thus, the additional tooling elements comprise a lower block 18A and an upper block 18B, stacked vertically between which a pre-impregnated composite material M is configured to be placed. The lower block 18A is placed over the first sole plate 12. The upper block 18B is configured to be movable in translation perpendicular to the first sole plate 12.

The tooling further includes a longitudinal bar 18C placed between the upper block 18B and the second sole plate (not represented). The longitudinal bar 18C is a compaction device configured to drive the upper block 18B in translation in the direction of the lower block 18A under the action of an additional cylinder (not represented).

The additional tooling elements 18A, 18B and the longitudinal bar 18C of the tooling of FIG. 8 are placed between a row (column or line) of cores 16A and a peripheral bar 16B.

The method for manufacturing a cascade 100 comprising flanges 104 (FIG. 14) for connection to a fixed structure or an external aerodynamic cowling of a nacelle using such a tooling, is similar to the method described with regards to FIGS. 4 and 5 with the difference that an additional compression step is carried out, preferably simultaneously with the compression step, during which a force F' is applied against the longitudinal bar 18C in the direction of the blocks 18A, 18B, perpendicular to the interface between the longitudinal bar 18C and the upper block 18B in order to bring the blocks close to each other and thus compress the pre-impregnated composite material M placed between the blocks.

Figure 9:
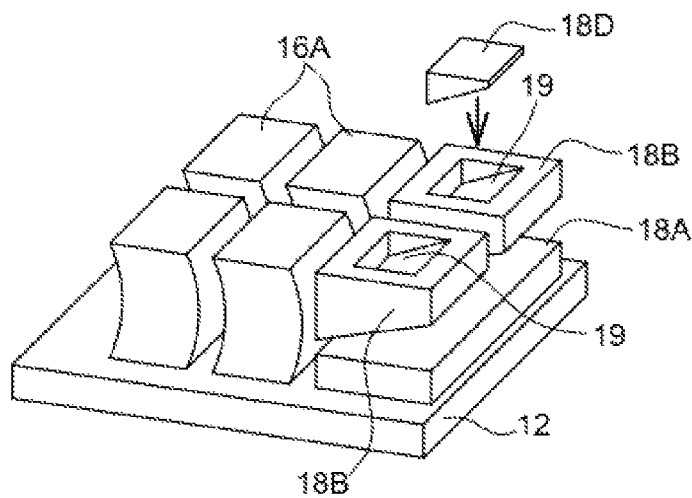
FIG. 9 is a partial schematic perspective view of a first variation of the tooling of FIG. 8.

FIG. 9 illustrates a first variant of the tooling of FIG. 8. Unlike the tooling of FIG. 8, the additional tooling elements comprise two upper blocks 18B placed on a lower block 18A, so that the pre-impregnated composite material is placed between each block in order to form a solid element having an inverted T-like shape.

Another difference is that the tooling does not include a longitudinal bar 18C, but a plurality of protuberances 18D placed on the second sole plate (not represented) and configured to cooperate with notches 19 placed on the upper face of each upper block 18B.

The protuberances 18D and the notches 19 form a compaction device configured to drive the upper blocks 18B in translation in the direction of the lower block 18A. According to this variant, the additional compression step does not require an additional cylinder.

Figure 10:
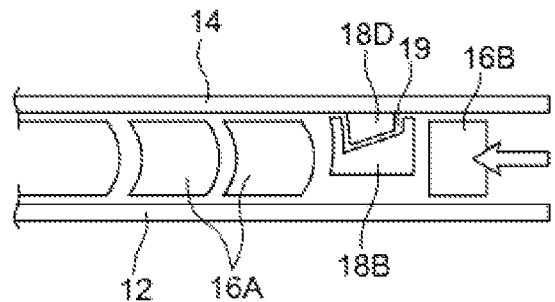
FIG. 10 is a partial schematic perspective view of a second variation of the tooling of FIG. 8.

FIG. 10 illustrates a second variant of the tooling of FIG. 8. Unlike the tooling of FIG. 8, the additional tooling elements comprise at least one upper block 18B configured to be placed over a layer of a pre-impregnated composite material during use of the tooling. In the same manner as with regards to FIG. 9, the upper block 18B includes a notch 19 configured to cooperate with a protuberance 18D placed over the upper sole plate 14. The protuberance 18D and the notch 19 form a compaction device allowing displacing the upper block 18B in order to compress the pre-impregnated composite material. According to this variant, the additional compression step does not require an additional cylinder.

Figure 11:
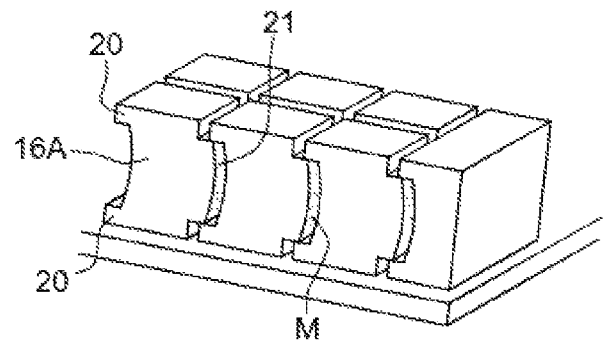
FIG. 11 is a schematic perspective view illustrating a first variation of tooling cores according to the present disclosure.

FIG. 11 illustrates a first variant of tooling cores according to the present disclosure. According to this first variant, the cores 16A include lower and upper spacers or excrescences 20, each excrescence 20 having a plate-like shape whose horizontal dimensions are substantially equal to the horizontal dimensions of the cores, each plate being offset with respect to the core in the same horizontal direction, so that the core has a C-like profile. The excrescences 20 are in contact with the first and second sole plates. Thus, two adjacent cores have complementary C-like profiles and could be interlocked, which allows creating a compression chamber 21 for the pre-impregnated composite material M installed between the cores. Furthermore, bringing the cores 16A close to each other is limited by the length of the excrescences associated with the length of a counterbore, while leaving a minimum space between the cores 16A, forming the compression chamber 21 for the pre-impregnated composite material M.

The counterbore has a length at least larger than the material compaction to be performed. For example, if the thickness of the longitudinal and transverse profiles 101 (FIG. 14) of the apertured element 100 to be obtained is 3 mm, and it is desired to compact the material by 300% to form the element 100 to be apertured, upon installation of the tooling the material occupies 9 mm of thickness between two adjacent tooling elements. Typically, the counterbore should be at least 10 mm for the tooling to fit interlock upon installation.

In one form, the excrescences 20 of adjacent cores 16A have complementary C shapes enabling them to be interlocked according to two directions when the cores 16A are brought close to each other. The excrescences 20 are means for delimiting a minimum space between the cores.

The excrescences 20 are integral with the cores 16A.

Alternatively, the excrescences 20 are elements distinct from the cores 16A.

In another form, the cores include a lower excrescence or an upper excrescence. The core then has a so-called L-shape.

Figure 12:
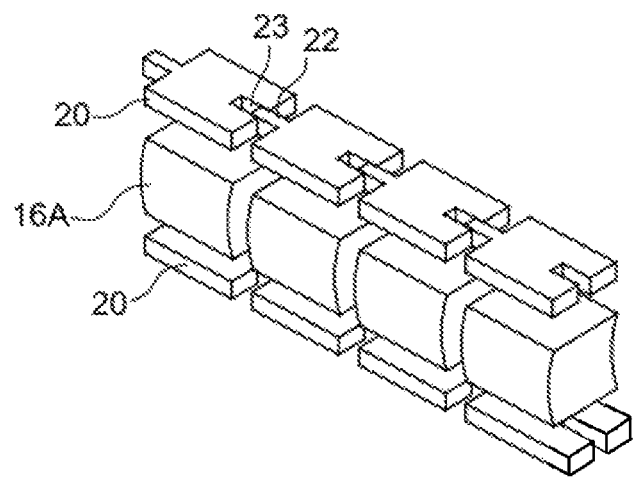
FIG. 12 is a schematic perspective view illustrating a second variation of tooling cores according to the present disclosure.

FIG. 12 illustrates a second variant of tooling cores according to the present disclosure. According to this second variant, the cores 16A include a lower excrescence 20 offset with respect to the core in a first horizontal direction, and an upper excrescence 20 offset with respect to the core in a second horizontal direction opposite to the first horizontal direction. The core then has a Z-like profile. In the example of FIG. 12, the excrescences 20 are organized in the longitudinal and transverse directions. Upon interlocking of the cores, they keep the ability to move in a vertical direction according to the direction predefined by the direction of the excrescence.

The excrescences 20 may include longitudinal indexing tabs 22, as represented in FIG. 12. These indexing tabs 22 are associated with complementary cavities 23 in the adjacent cores allowing the cores 16A to be brought close to each other and interlocked, thereby providing a better guidance.

In some forms, the indexing tabs 22 of adjacent cores 16A have complementary C, V or half-moon shapes.

Furthermore, in other variants, indexing tabs may be placed above or below the excrescences 20.

In some forms, indexing tabs are provided on two sides of the excrescences 20 associated with cavities in the adjacent cores, enabling interlocking of the adjacent cores in two horizontal directions. This allows improving the relative guidance in position of two cores according to two directions, when the cores 16A are brought close to each other and therefore improving the relative position of two cells in the molded cascade.

The indexing tabs 22 are elements distinct from the cores 16A.

Alternatively, the indexing tabs 22 are integral with the cores 16A.

In some forms, the complementary shapes on the excrescences 20 may include grooves for installing flexible gaskets to improve sealing above and/or above the cores.

In other forms, the complementary shapes on the excrescences 20 may include peripheral protuberances configured to press against each other to work harden in contact with the adjacent core and thus allow for vertical sealing of the inter-core molding areas.

Figure 13:
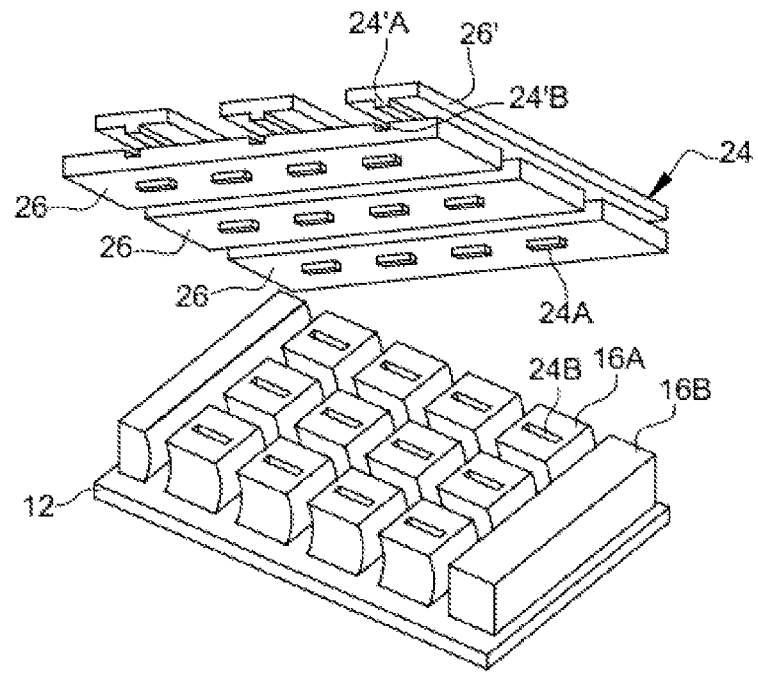
FIG. 13 is a partial schematic perspective view of the tooling of FIG. 1 comprising guides for guiding the tooling elements.

FIG. 13 represents the tooling of FIG. 1, further comprising guides 24 for guiding the tooling elements 16.

The guides 24 are configured to guide the tooling elements 16 in their displacement so that they have a better relative positioning.

The guides 24 include ribs 24A cooperating with grooves 24B.

More particularly, in a first example, the guides 24 include crosspieces 26, each crosspiece 26 being placed in contact with a row of cores 16A, between the cores 16A and the second sole plate (not represented). Each crosspiece 26 includes ribs 24A cooperating with longitudinal grooves 24B placed on the cores at the interface between the cores 16A and the crosspieces 26. Thus, these ribs 24A and grooves 24B allow guiding the displacement of the cores 16A in a first direction.

In a second example, the guides further include additional crosspieces 26' extending between the crosspieces 26 and the second sole plate (not represented) and extending perpendicular to the crosspieces 26. Each additional crosspiece 26' includes an additional rib 24'A cooperating with additional grooves 24'B placed on the crosspieces 26 opposite to the ribs 24A. Thus, these additional ribs 24'A and additional grooves 24'B allow guiding the displacement of the cores 16A in a second direction.

In other forms, the additional guides are repeated above and below the cores, that is to say as spacers between the first sole plate and the core on the one hand and the core and the second sole plate on the other hand.

In the illustrative figures, rows of cells organized according to two perpendicular directions of a quadrilateral are shown. The tooling according to the present disclosure is also suitable if the cell profiles are not all perpendicular to each other. For example, it is possible to consider parallel longitudinal profiles and transverse profiles placed at an angle, according to similar directions that may or may not be at an angle between two rows.

FIG. 14 illustrates a thrust reverser cascade 100 for an aircraft nacelle obtained thanks to the method according to the present disclosure.

The cascade 100 includes air passage cells 102, delimited by longitudinal and transverse profiles 101, and flanges 104 for connecting the cascade 100 to a fixed structure or an external aerodynamic cowling of the nacelle (not represented).

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tooling for manufacture of an apertured element made of a composite material, the tooling including:
   first and second sole plates, each of the first and second sole plates being configured to be placed on either side of the apertured element to be manufactured; and
   tooling elements placed between the first and second sole plates, the tooling elements comprising:
      at least one core configured to delimit a cell of the apertured element to be manufactured, with an entirety of the at least one core being slidable along the first and second sole plates, and
      peripheral bars placed on a periphery of the at least one core and configured to delimit the apertured element to be manufactured, at least one peripheral bar being movable in translation along the first and second sole plates.

2. The tooling according to claim 1, wherein the first and second sole plates are curved with an angular sector in a range of 30 degrees to 60 degrees.

3. The tooling according to claim 1, wherein each peripheral bar is movable in translation along the first and second sole plates.

4. The tooling according to claim 1, wherein the tooling elements further comprise at least two adjacent peripheral bars connected together so as to form an L-shaped angle bar.

5. The tooling according to claim 4, wherein the L-shaped angle bar is not movable in translation along the first and second sole plates.

6. The tooling according to claim 4, wherein the L-shaped angle bar is movable in translation along the first and second sole plates.

7. The tooling according to claim 1, further comprising displacing devices configured to apply a force against each peripheral bar movable in translation.

8. The tooling according to claim 1, further comprising additional tooling elements configured to be placed between the first and second sole plates between the at least one core and one peripheral bar, the additional tooling elements being configured to enable molding of solid flange elements.

9. The tooling according to claim 8, wherein the additional tooling elements include at least one block movable in translation perpendicular to the first and second sole plates and configured to delimit a solid flange element.

10. The tooling according to claim 9, further comprising a compaction device configured to provide the translation of the at least one block in order to enable compaction of the composite material placed in the tooling to form the solid flange element at least in part.

11. The tooling according to claim 1, further comprising at least two cores and devices for delimiting a minimum space between the at least two cores.

12. The tooling according to claim 1, further comprising guides configured to guide movement of the tooling elements.

13. The tooling according to claim 1, wherein the at least one core has a first end coupled to the first sole plate and a second end coupled to the second sole plate, and the first end and the second end of the at least one core are slidable along a respective one of the first and second sole plates.

14. A method for manufacturing apertured elements made of a composite material by compression molding in the tooling according to claim 1, the method comprising:
(a) a step of disposing the tooling elements and a material configured to form the apertured element at least in part during which the tooling elements are placed between the first and second sole plates, and the material configured to form the apertured element at least in part between the tooling elements, so as to obtain a closed tooling in which the material configured to form the apertured element at least in part is trapped between the tooling elements and forms a resistance to inhibit the tooling elements from approaching each other;
(b) a compression step during which a force is applied against the peripheral bars in the direction of the at least one core, so as to allow approaching of the tooling elements to each other and thus compaction of the material configured to form the apertured element at least in part;
(c) a consolidation step during which the material configured to form the apertured element at least in part hardens; and
(d) a step of demolding the apertured element thus formed.

15. The method according to claim 14, wherein adjacent cores are configured to be displaced so that a spacing between the adjacent cores is variable between 100% and 300% of the final thickness of the apertured element to be obtained.

* * * * *